US010597140B2

(12) United States Patent
Thompson et al.

(10) Patent No.: US 10,597,140 B2
(45) Date of Patent: Mar. 24, 2020

(54) METHODS OF CONFIGURING A WING TIP DEVICE ON AN AIRCRAFT

(71) Applicant: Airbus Operations Limited, Bristol (GB)

(72) Inventors: Robert Ian Thompson, Bristol (GB); Geoffrey Richard Williams, Bristol (GB); Nicholas Livings, Bristol (GB); Kevin Nicholls, Bristol (GB)

(73) Assignee: Airbus Operations Limited, Bristol (GB)

( * ) Notice: Subject to any disclaimer, the term of this patent is extended or adjusted under 35 U.S.C. 154(b) by 356 days.

(21) Appl. No.: 15/629,013

(22) Filed: Jun. 21, 2017

(65) Prior Publication Data

US 2017/0369151 A1    Dec. 28, 2017

(30) Foreign Application Priority Data

Jun. 22, 2016    (GB) .................................. 1610899.5

(51) Int. Cl.
*B64C 3/56*    (2006.01)
*B64C 3/40*    (2006.01)
*B64C 3/58*    (2006.01)

(52) U.S. Cl.
CPC .................. *B64C 3/56* (2013.01); *B64C 3/40* (2013.01); *B64C 3/58* (2013.01); *Y02T 50/14* (2013.01)

(58) Field of Classification Search
CPC .... B64C 3/40; B64C 3/56; B64C 3/58; B64C 23/72; B64C 23/76; B64C 23/65; Y02T 50/14; Y02T 50/164
See application file for complete search history.

(56) References Cited

U.S. PATENT DOCUMENTS

| 1,710,673 | A | * | 4/1929 | Bonney | ..................... B64C 3/44 |
| | | | | | 244/215 |
| 1,731,757 | A | * | 10/1929 | Tubbe | ....................... B64C 3/56 |
| | | | | | 244/49 |

(Continued)

FOREIGN PATENT DOCUMENTS

| EP | 2 857 309 | 4/2015 |
| GB | 2524827 | 10/2015 |

(Continued)

OTHER PUBLICATIONS

Search Report for GB1610899.5 dated Nov. 21, 2016, 4 pages.

(Continued)

*Primary Examiner* — Medhat Badawi
(74) *Attorney, Agent, or Firm* — Nixon & Vanderhye P.C.

(57) ABSTRACT

A method of configuring a wing tip device (7) on an aircraft (1), including: undertaking ground-based operations at an airport with the wing tip device (7) in a ground configuration, in which the span of the aircraft is within an airport compatibility limit, moving the wing tip device (7) to a take-off configuration in which the wing tip device (7) is moved away from the ground configuration such that the span of the aircraft is increased and such that the wing tip device (7) has a first lift coefficient; taking-off with the wing tip device (7) in the take-off configuration; moving the wing tip device from the take-off configuration to a flight configuration, in which the wing tip device has a second lift coefficient, the second lift coefficient being lower than the first lift coefficient. The lift coefficient may be changed by adjusting the sweep of the wing tip device (7).

15 Claims, 7 Drawing Sheets

(56) References Cited

U.S. PATENT DOCUMENTS

| | | | | |
|---|---|---|---|---|
| 1,819,794 | A * | 8/1931 | Schultze | B64C 3/56 244/49 |
| 2,397,526 | A * | 4/1946 | Bonbright | B64C 29/0025 244/12.1 |
| 2,418,301 | A * | 4/1947 | Heal | B64C 3/42 244/91 |
| 2,961,196 | A * | 11/1960 | Atkinson | B64C 3/40 244/46 |
| 3,974,986 | A * | 8/1976 | Johnstone | B64C 23/06 244/199.3 |
| 4,698,041 | A * | 10/1987 | Dasa | A63H 27/00 446/61 |
| D304,821 | S * | 11/1989 | Ratony | D12/331 |
| 4,998,689 | A * | 3/1991 | Woodcock | B64C 3/38 244/46 |
| 5,072,894 | A * | 12/1991 | Cichy | B64C 3/42 244/91 |
| 5,100,081 | A * | 3/1992 | Thomas | B64C 13/30 244/220 |
| 5,310,138 | A * | 5/1994 | Fitzgibbon | B64C 3/56 244/49 |
| 5,350,135 | A * | 9/1994 | Renzelmann | B64C 3/56 244/49 |
| 5,381,986 | A * | 1/1995 | Smith | B64C 3/56 244/49 |
| 5,427,329 | A * | 6/1995 | Renzelmann | B64C 3/56 244/49 |
| 5,538,202 | A * | 7/1996 | Thornburg | B64C 13/36 244/215 |
| 5,785,282 | A * | 7/1998 | Wake | B64C 27/463 244/130 |
| 5,899,410 | A * | 5/1999 | Garrett | B64C 39/068 244/45 R |
| 5,988,563 | A * | 11/1999 | Allen | B64C 3/42 244/49 |
| 6,076,766 | A * | 6/2000 | Gruensfelder | B64C 3/56 244/130 |
| 6,173,924 | B1 * | 1/2001 | Young | B64C 3/48 244/215 |
| 7,780,120 | B1 * | 8/2010 | Fairchild | B64C 3/54 244/218 |
| 8,651,431 | B1 * | 2/2014 | White | B64C 23/076 244/218 |
| 8,708,286 | B2 * | 4/2014 | Sakurai | B64C 3/56 244/201 |
| 8,757,538 | B2 * | 6/2014 | Seifert | B64C 3/10 244/49 |
| 9,290,260 | B2 * | 3/2016 | Lassen | B64C 3/56 |
| 9,296,471 | B2 * | 3/2016 | Sakurai | B64C 9/00 |
| 9,499,252 | B2 * | 11/2016 | Lassen | B64C 3/56 |
| 9,714,080 | B2 * | 7/2017 | Bradshaw | B64C 23/076 |
| 9,764,825 | B2 * | 9/2017 | Guida | B64C 23/065 |
| 9,889,920 | B2 * | 2/2018 | Harding | B64C 3/56 |
| 9,896,186 | B2 * | 2/2018 | Fong | B29C 70/222 |
| 10,189,557 | B2 * | 1/2019 | Boye | B64C 3/56 |
| 2009/0200431 | A1 * | 8/2009 | Konings | B64C 3/385 244/213 |
| 2012/0091262 | A1 * | 4/2012 | Rawdon | B64C 23/069 244/36 |
| 2013/0099060 | A1 | 4/2013 | Dees et al. | |
| 2014/0117151 | A1 * | 5/2014 | Fox | B64C 23/072 244/49 |
| 2015/0158578 | A1 * | 6/2015 | Guida | B64C 23/069 244/199.4 |
| 2015/0298793 | A1 * | 10/2015 | Fox | B64C 3/56 244/49 |
| 2016/0009378 | A1 * | 1/2016 | Guida | B64C 5/10 244/199.4 |
| 2016/0176506 | A1 * | 6/2016 | Cross | B64C 9/00 416/1 |
| 2016/0244145 | A1 * | 8/2016 | Thompson | B64C 3/56 |
| 2017/0021911 | A1 * | 1/2017 | Wildschek | B64C 3/38 |
| 2017/0369151 | A1 * | 12/2017 | Thompson | B64C 3/40 |

FOREIGN PATENT DOCUMENTS

| | | |
|---|---|---|
| GB | 2524828 | 10/2015 |
| GB | 2535580 | 8/2016 |
| WO | WO 2015/150816 | 10/2015 |
| WO | WO 2015/150835 | 10/2015 |
| WO | WO 2015/162399 | 10/2015 |

OTHER PUBLICATIONS

Edward White et al., "Novel Control Effectors for Truss Braced Wing", NASA/CR-2015-218792, Boeing / NASA Study, Aug. 2015, 236 pages.

[Online], Wikipedia—Sukhoi Su-17, https://en.wikipedia.org/wiki/Sukhoi_Su-17, retrieved Jun. 20, 2017, 15 pages.

* cited by examiner

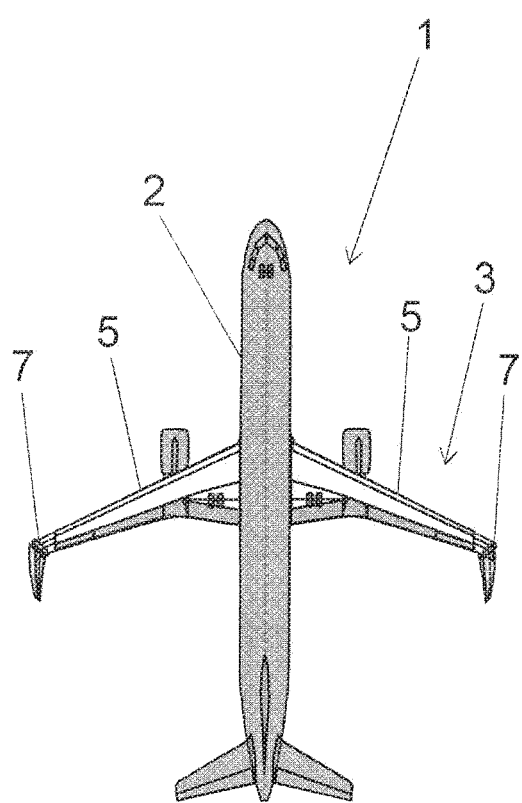
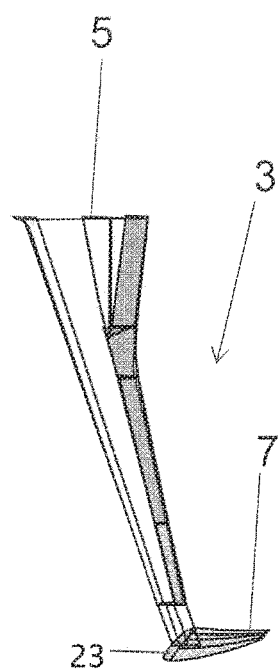
Figure 2a
Figure 2b

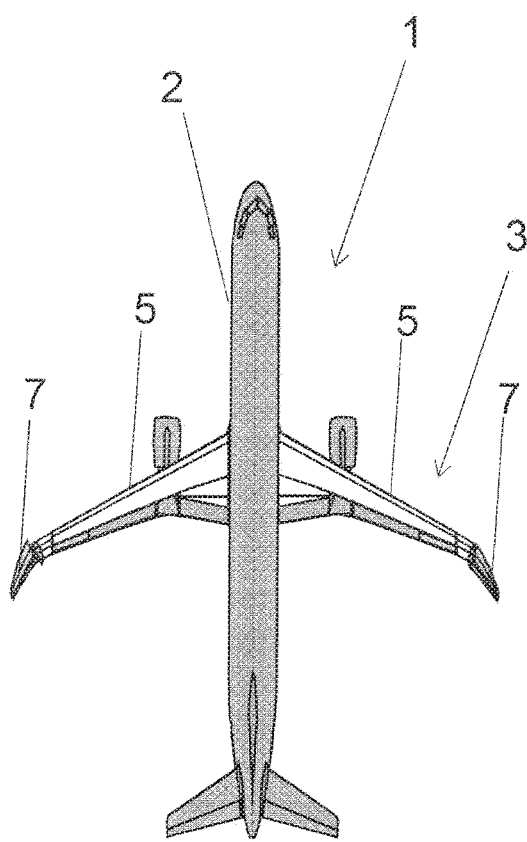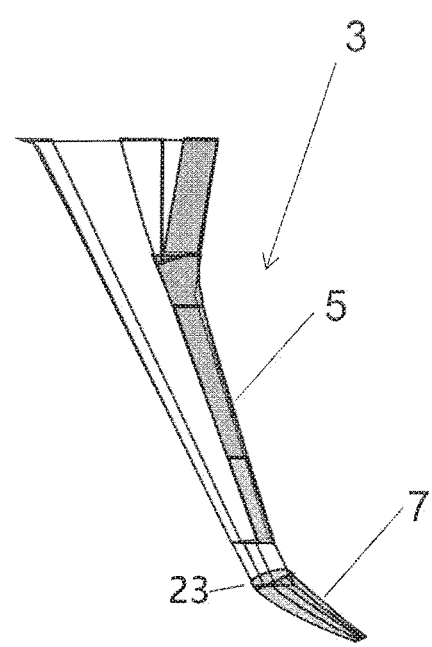
Figure 6a                    Figure 6b # METHODS OF CONFIGURING A WING TIP DEVICE ON AN AIRCRAFT

RELATED APPLICATION

This application claims priority to United Kingdom (GB) patent application 1610899.5 filed Jun. 22, 2016, the entire content which is hereby incorporated by reference.

FIELD OF THE INVENTION

The present invention relates to methods of configuring a moveable wing tip device on an aircraft, especially for take-off and/or landing of the aircraft. The present invention also relates to an aircraft for use in such a method.

BACKGROUND OF THE INVENTION

There is a trend towards increasingly large passenger aircraft with higher performance efficiency (for example fuel burn reduction). It is desirable for these aircraft to have correspondingly large wing spans, in order to maximise performance efficiency. However, maximum aircraft span is effectively limited by airport operating rules that govern various clearances required when manoeuvring around the airport (such as span and/or ground clearance required for gate entry and safe taxi usage).

To address this problem, various arrangements comprising moveable wing tip devices, that specifically enable the span to be reduced in a ground configuration, have been suggested. US2013/0099060 and WO2015/150816 are examples of moveable wing tip devices in which the wing tip device is moveable about a hinge. In another arrangement, shown in WO2015/150835, the wing tip device and the fixed wing are separated along an oblique cut plane, and the wing tip device is rotatable about an axis of rotation perpendicular to the cut plane.

In these designs, the wing tip device is configurable between: (i) a flight configuration for use during flight and (ii) a ground configuration for use during ground-based operations, in which ground configuration the wing tip device is moved away from the flight configuration such that the span of the aircraft wing is reduced. In the flight configuration, the wing tip device tends to be an extension of the outer part of the fixed wing, and the span typically exceeds an airport compatibility limit (such as a gate limit). In the ground configuration the span is typically reduced such that the span (with the wing tip device in the ground configuration) is less than, or substantially equal to, the airport compatibility gate limit.

The wing tip device in the flight configuration tends to be arranged to provide acceptable performance during a range of flight conditions (e.g. cruise, climb and take-off/landing). In order to provide acceptable performance across this range of conditions, the performance in each specific flight condition necessarily tends to be sub-optimal.

The present invention seeks to mitigate at least some of the above-mentioned problems.

SUMMARY OF THE INVENTION

According to a first aspect of the invention, there is provided a method of configuring a wing tip device on an aircraft, the aircraft comprising a wing having a fixed wing with the wing tip device moveably mounted at the outer end thereof, wherein the method comprises the steps of: (i) undertaking ground-based operations at an airport with the wing tip device in a ground configuration, in which ground configuration the span of the aircraft is within an airport compatibility limit; (ii) moving the wing tip device to a take-off configuration in which the wing tip device is moved away from the ground configuration such that the span of the aircraft is increased beyond the airport compatibility limit, and such that the wing tip device has a first lift coefficient (iii) taking-off with the wing tip device in the take-off configuration; (iv) moving the wing tip device from the take-off configuration to a flight configuration, in which flight configuration the wing tip device is moved away from the take-off configuration such that the wing tip device has a second lift coefficient, the second lift coefficient being lower than the first lift coefficient.

The aircraft compatibility limit is preferably a gate limit. The prior art already recognises that a moveable wing tip device is advantageous in providing a large wing span aircraft (during flight) that can still comply with airport compatibility gate limits on the ground. The present invention recognises that a moveable wing tip device can then also be used to facilitate additional advantages; namely that it can be used in a plurality of different configurations that are each tailored to different parts of the flight regime. Aspects of the present invention recognise that the performance of the aircraft can be better tailored for take-off by configuring the wing tip device into the take-off configuration (in which it has a high-lift coefficient), and then better tailored for another flight condition (such as climb) by configuring the wing tip device in flight configuration (in which it has a lower lift coefficient).

In the take-off configuration the wing tip device may be optimised for take-off of the aircraft. In the take-off configuration the wing tip device may be swept at a first sweep angle. In the flight configuration the wing tip device may be moved such that it is swept at a second sweep angle, the second sweep angle being greater than the first sweep angle. Adjusting the sweep of the wing tip device has been found to be an especially effective way of altering the lift coefficient such that it is more suited to the flight regime in question. In the take-off configuration the first sweep angle may be less than the sweep of the outer end of the fixed wing, such that the wing tip device is swept forward relative to the fixed wing.

The wing tip device may be moveable to a plurality of configurations for use during flight. In some embodiments of the invention, the flight configuration is a first flight configuration for the climb/decent phase of flight. The method may comprise the step of: moving the wing tip device from the first flight configuration, to a second flight configuration, the second flight configuration being for cruise flight.

In the second flight configuration the wing tip device may have a third lift coefficient, the third lift coefficient being less than the second lift coefficient. In the second flight configuration, the wing tip device may be swept back to a third sweep angle, the third sweep angle being greater than the second sweep angle.

The present invention is especially applicable to aircraft in which the span during flight is larger than an airport compatibility gate limit (but in the ground configuration the span is within that gate limit). In the take-off configuration the span exceeds the gate limit. In the first and/or second flight configuration the span of the aircraft preferably also exceeds the airport compatibility gate limit.

In at least one of the first and/or the second flight configuration: the trailing edge of the wing tip device is preferably a continuation of the trailing edge of the fixed wing; the leading edge of the wing tip device is preferably a continuation of the leading edge of the fixed wing; there is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. In the first and/or the second flight configuration: the upper and the lower surfaces of the wing tip device may be continuations of the upper and lower surfaces of the fixed wing.

It will be appreciated that reference herein to "the first and/or second flight configuration" is applicable to embodiments having only one flight configuration (in which case that configuration is deemed the 'first' flight configuration), as well as embodiments having a plurality of flight configurations.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft may comprise a locking assembly for locking the wing tip device in one or more of the configurations. The wing tip device may be locked in the first flight configuration by the locking assembly. The wing tip device may be locked in the second flight configuration by the locking assembly. The wing tip device may be locked in the take-off configuration by the locking assembly. The wing tip device may be locked in the ground configuration by the locking assembly. When moving between the different configurations, the locking assembly may release a lock to unlock the wing tip device from one configuration, and allow movement to another configuration. After that movement, the locking assembly may reapply the lock to lock the wing tip device in that other configuration.

Movement of the wing tip device between the configurations may be in response to a command signal. The command signal may be input by the pilot. The command signal may be generated automatically (for example by a control system).

It will be appreciated that the aircraft typically comprises two wings, symmetrical about the centre-line of the aircraft fuselage. Each wing preferably comprises a fixed wing and with a wing tip device moveably mounted at the outer end thereof, between the plurality of configurations. References herein to the changing of configuration of a wing tip device, may apply equally to both the wing tip devices on the aircraft (i.e. to either wing). The configurations of the wing tip devices are preferably changed in synchronisation. The configurations of the wing tip devices are preferably changed such that the wings, and the wing tip devices, maintain their symmetry. Such arrangements tend to avoid any asymmetric load or drag conditions.

According to a second aspect of the invention, there is provided a method of configuring a wing tip device on an aircraft, the aircraft comprising a wing having a fixed wing with the wing tip device moveably mounted at the outer end thereof, wherein the method comprises the steps of: (i) flying the aircraft with the wing tip device in a flight configuration, in which flight configuration the wing tip device has a second lift coefficient, (ii) moving the wing tip device to a landing configuration in which the wing tip device is moved away from the flight configuration such that the wing tip device has a first lift coefficient, the first lift coefficient being greater than the second lift coefficient; (iii) landing the aircraft at an airport with the wing tip device in the landing configuration; (iv) moving the wing tip device to a ground configuration, in which ground configuration the span of the aircraft is reduced to within the airport compatibility limit, and undertaking ground-based operations at the airport with the wing tip device in the ground configuration. This aspect of the present invention recognises that the performance of the aircraft can be better tailored for landing by configuring the wing tip device into the landing configuration (in which it has a high-lift coefficient), but better tailored for another flight condition by configuring the wing tip device in a flight configuration (in which it has a lower lift coefficient).

In the landing configuration the wing tip device may be optimised for the landing of the aircraft. In some embodiments, the landing configuration may be the same as the take-off configuration in the first aspect of the invention. In some embodiments, the landing configuration may be another high-lift configuration. Features described with reference to the take-off configuration may be equally applicable to the landing configuration. The flight configuration may be the same as the first or second flight configuration in the first aspect of the invention and features described with reference to that flight configuration may be equally applicable to the flight configuration in the second aspect. The ground configuration may be the same as the ground configuration in the first aspect of the invention and features described with reference to that ground configuration may be equally applicable to the ground configuration in the second aspect.

The wing tip device may be rotatable between the configurations about an axis of rotation. Aspects of the present invention have been found to be especially beneficial in arrangement in which the wing tip device is moveable between the configurations by rotation about an axis which is oriented perpendicular to an oblique cut plane separating the wing tip device and the fixed wing. Such an arrangement may provide a continuous range of movement and is therefore especially useful when moving the wing tip device between multiple configurations. It is also especially beneficial in embodiments in which it is desirable for the wing tip device to have a different sweep angle and/or angle of attack in the different configurations, because such an orientation of axis tends to inherently alter the sweep angle as the wing tip device is rotated.

The above-mentioned cut plane is preferably oblique. The cut plane preferably extends through the upper and lower surfaces of the wing. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The oblique cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing.

The axis of rotation may be orientated at an angle to (i.e. not including being parallel or perpendicular to a longitudinal direction. The axis is preferably at an angle to (i.e. not including being parallel or perpendicular to a lateral direction. The axis is preferably at an angle to (i.e. not including being parallel or perpendicular to a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing.

The wing tip device may be a wing tip extension; for example the wing tip device may be a planar tip extension. In other embodiments, the wing tip device may comprise, or consist of, a non-planar device, such as a winglet. The wing tip device is at the tip of the wing and is small relative to the fixed wing. For example, it will be appreciated that the additional span of the wing tip device is only a small proportion of the span of the whole wing.

According to yet another aspect of the invention, there is provided an aircraft for use in the method described herein. The aircraft comprises a wing having a fixed wing with the wing tip device moveably mounted at the outer end thereof, the wing tip device being configurable between (i) a ground configuration for use in ground-based operations, in which ground configuration the span of the aircraft is within an airport compatibility limit; (ii) a take-off configuration in which the wing tip device is moved away from the ground configuration such that the span of the aircraft is increased beyond the airport compatibility limit, and such that the wing tip device has a first lift coefficient; and (iii) a flight configuration, in which flight configuration the wing tip device is moved away from the take-off configuration such that the wing tip device has a second lift coefficient, the second lift coefficient being lower than the first lift coefficient.

The aircraft may comprise a control system for controlling movement of the wing tip device between the configurations. The control system may be arranged to: receive an input to indicate that the airport gate compatibility limit is allowed to be exceeded; in response to said input, control movement of the wing tip device from the ground configuration to the take-off configuration as part of the take-off procedure; receive an input to indicate that a take-off phase has been completed, and, in response to said input, control movement from the take-off configuration to the flight configuration. The input signal may be, for example, from pilots directly, or an automated signal which could be related to, for example, aircraft speed or location.

According to yet another aspect of the invention, there is provided an aircraft for use in the method described herein. The aircraft comprises a wing having a fixed wing with the wing tip device moveably mounted at the outer end thereof, the wing tip device being configurable between (i) a flight configuration, in which flight configuration the wing tip device has a second lift coefficient (ii) a landing configuration, in which the wing tip device is moved away from the flight configuration such that the wing tip device has a first lift coefficient, the first lift coefficient being greater than the second lift coefficient; and (iii) a ground configuration, in which the wing tip device is moved away from the landing configuration to a ground configuration in which the span of the aircraft is reduced to within the airport compatibility limit.

The aircraft may comprise a control system for controlling movement of the wing tip device between the configurations. wherein the control system is arranged to: receive an input to indicate that the landing phase has been started, in response to said input, control movement of the wing tip device from the flight configuration to the landing configuration as part of the landing procedure; receive an input to indicate that the landing phase has been completed, and, in response to said input, control movement from the landing configuration to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention. For example, the methods of the invention may incorporate any of the features described with reference to the apparatus of the invention and vice versa. Furthermore features described only in reference to an aspect of the invention relating to take-off may be equally applicable to an aspect of the invention relating to landing, and vice versa.

DESCRIPTION OF THE DRAWINGS

Embodiments of the present invention will now be described by way of example only with reference to the accompanying schematic drawings of which:

FIGS. 2a and 2b show the aircraft of FIG. 1 with the wing tip device in a ground configuration (FIG. 2b showing a wing and wing tip device in close up);

FIGS. 6a and 6b show the aircraft of FIG. 1 with the wing tip device in a second flight (cruise) configuration (FIG. 5b showing a wing and wing tip device in close up)

DETAILED DESCRIPTION

Figure 1:
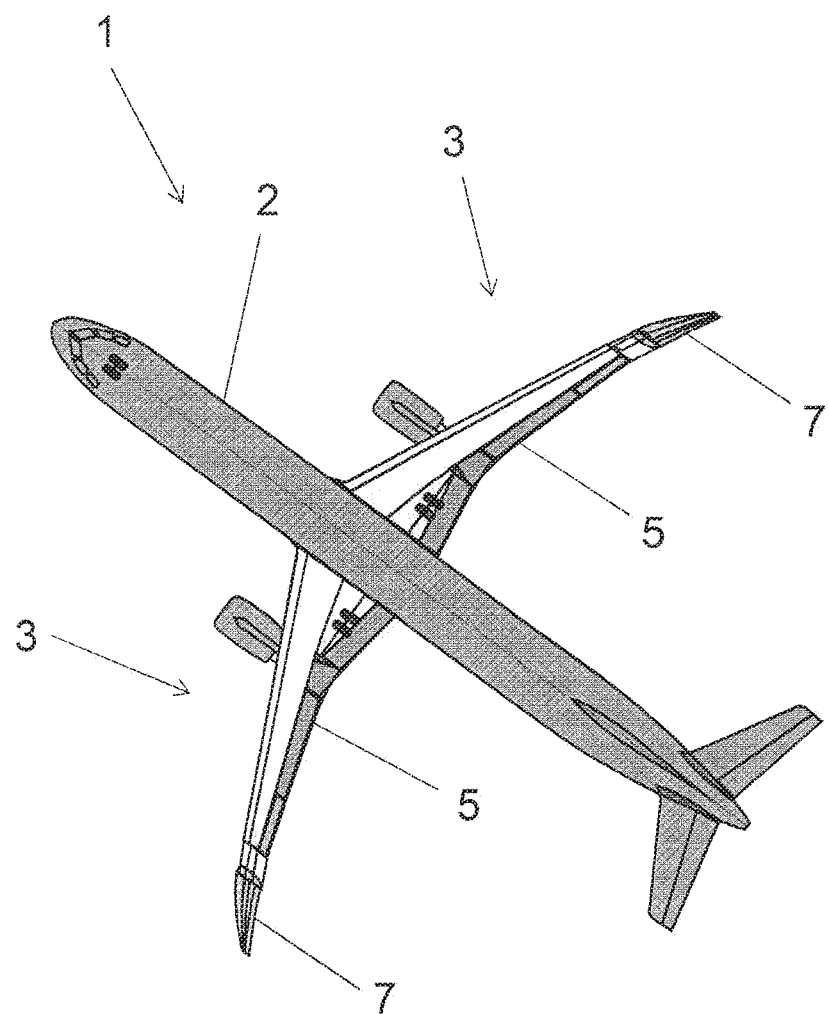
FIG. 1 shows a plan view of an aircraft according to a first embodiment of the invention.

FIG. 1 is a plan view of an aircraft 1 according to a first embodiment of the invention. The aircraft 1 comprises a two wings 3 positioned symmetrically on either side of the aircraft fuselage 2. Each wing 3 comprises a fixed inner wing 5, and wing tip device 7 (shown as a shaded component for the sake of clarity) mounted at the outer end 5a thereof. Hereinafter, reference is often made to one of the wings/ wing tip devices, but it will be appreciated that the description applies to both wing tip devices 7 on the aircraft 1.

The wing tip device 7 is mounted on a joint that allows the wing tip device 7 to rotate relative to the fixed wing 5. In the first embodiment of the invention, the wing tip device 7 and the fixed wing 5 are separated along an oblique cut plane 23 passing through the upper and lower surfaces of the wing. The oblique cut plane is oblique to a plane extending through the wing in both spanwise and chordwise directions. Also due to the oblique cut plane, the end of the wing tip device 7 may form an over-cut or an under cut with respect to an end of the fixed wing. The wing tip device 7 is rotatable about an axis that extends in a direction perpendicular to the oblique cut plane. Such a joint is described in WO2015/150835, to which reference should be made for further details of the type of joint. In summary, it allows a range of rotational movement of the wing tip device in a manner that alters the span of the aircraft, whilst avoiding clashing between the wing tip device and the fixed wing.

In a manner already known in the prior art, the wing tip device 7 is rotatable relative to the fixed wing 5 between two configurations per se, namely a ground configuration and a flight configuration. This can be best understood with reference to FIGS. 2a to 3b, to which reference is now made.

FIGS. 2a and 2b show the aircraft 1 on the ground at an airport, with the wing tip device 7 in a ground configuration. The wing tip device 7 is rotated to move the wing tip device upward and rearward such that the span of the aircraft wing 3 is reduced to within the airport compatibility gate limit. In this configuration, the aircraft 1 is unsuitable for flight, but the aircraft is able to perform ground-based operations (such as taxiing to and from the gate) within regions of the airport at which the gate limits apply.

Figures 3A, 3B:
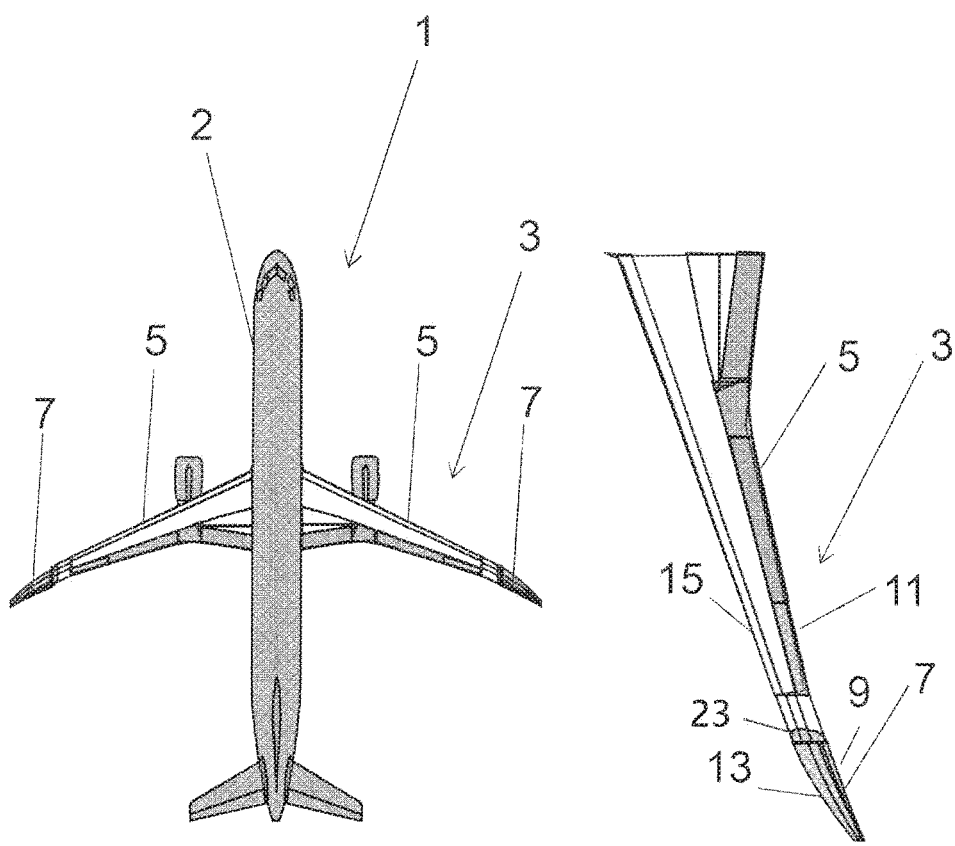
FIGS. 3a and 3b show the aircraft of FIG. 1 with the wing tip device in a first flight (climb) configuration (FIG. 3b showing a wing and wing tip device in close up)

FIGS. 3a and 3b show the wing tip device 7 moved into another configuration. In this configuration, the wing tip device is an extension of the fixed wing, such that the trailing edge 9 of the wing tip device 7 is a continuation of the trailing edge 11 of the fixed wing 5, and the leading edge 13 of the wing tip device 7 is a continuation of the leading edge 15 of the fixed wing 5. There is a smooth transition from the fixed wing 5 to the wing tip device 7. The sweep of the wing tip device 7 substantially matches that of the fixed wing 5, and the upper and lower surfaces of the wing tip device 7 are continuations of the upper and lower surfaces of the fixed wing 5. This configuration is used during flight and is therefore not constrained by airport compatibility gate limits. Accordingly, in this flight configuration, the aircraft can take advantage of the efficiency benefits of having a large span (exceeding the airport compatibility gate limit) yet the aircraft can also still operate at airports by moving the wing tip device to the ground configuration once it has landed at the airport.

Figure 4:
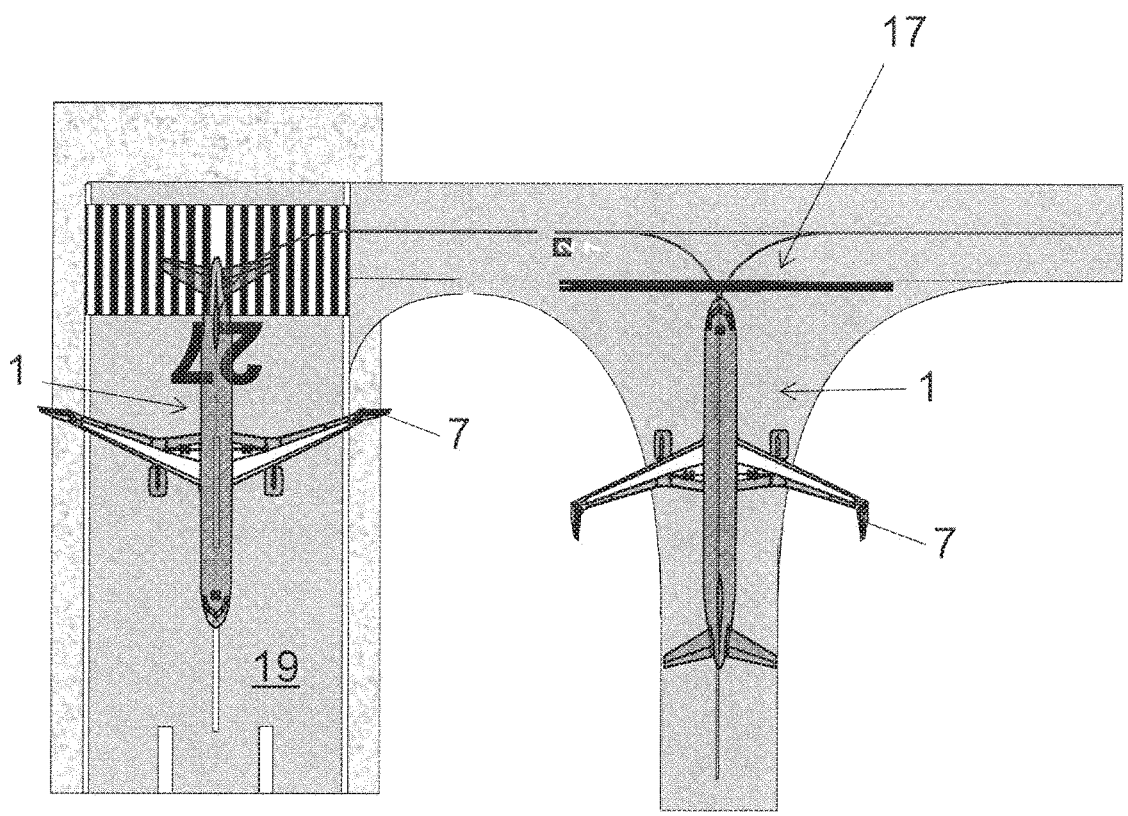
FIG. 4 shows the aircraft of FIG. 1 taxiing in the ground configuration and then preparing for take-off with the wing tip device in a take-off configuration.

The above-mentioned advantage of such a moveable wing tip device is already known. However, as will now be explained with reference to FIG. 4 onwards, embodiments of the present invention enable and facilitate further advantages:

FIG. 4 shows the aircraft 1, firstly as it is reaching the boundary 17 of where the airport gate limits apply (right-hand side of FIG. 4) and secondly as it has subsequently manoeuvred onto the start of the runway 19 (left-hand image of FIG. 4).

Where the gate limits apply, the aircraft 1 is maintained with the wing tip 7 in the ground configuration. However, as the aircraft approaches the boundary 17 onto the runway, the wing tip device 7 is moved into a take-off configuration in which the wing tip device 7 is swept forward relative to the sweep of the fixed wing 5. The aircraft has this configuration when it enters the runway. This take-off configuration is shown in more detail in FIGS. 5a and 5b.

Figure 5A:
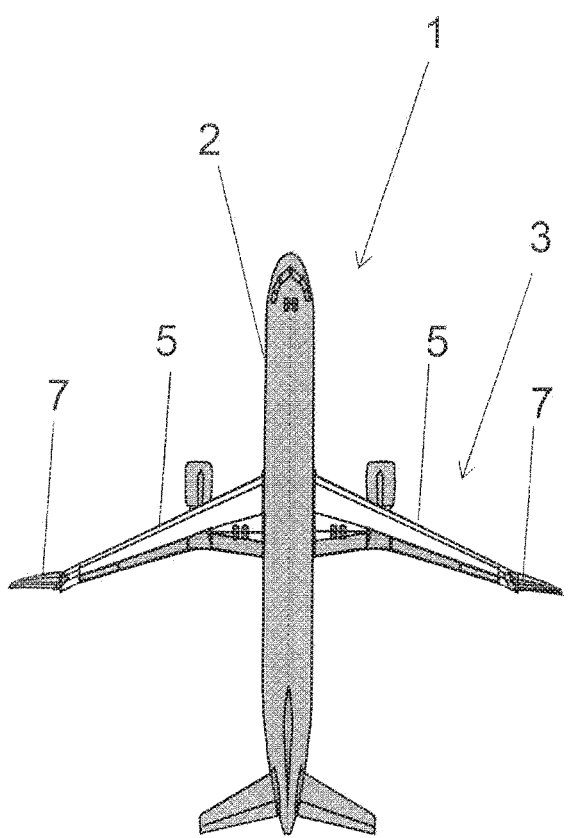
FIGS. 5a and 5b show the aircraft of FIGS. 1 and 4 with the wing tip device in the take-off configuration (FIG. 5b showing a wing and wing tip device in close up)
Figure 5B:
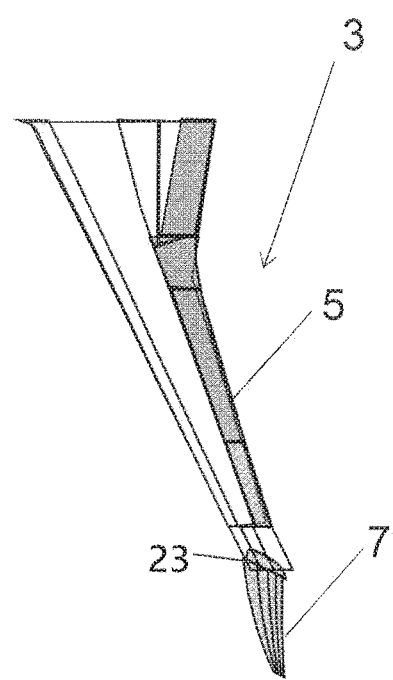

Referring to FIGS. 5a and 5b, the wing tip device 7 has been rotated such that it moves forward to an orientation in which the sweep is less than the sweep of the fixed wing. Although this may be less efficient from the drag perspective, the wing tip device in this orientation has an improved (higher) lift coefficient than the wing tip device in the flight configuration shown in FIGS. 3a and 3b, which makes it better suited to use on take-off.

The wing tip device 7 is locked into the take-off configuration by a locking assembly (not shown) and aircraft 1 is designed to take off with the wing tip device 7 in this take-off configuration. Once the aircraft 1 enters the climb phase of the flight regime, the wing tip device 7 is unlocked and is moved to the first flight configuration shown in FIGS. 3a and 3b. The locking assembly locks the wing tip device 7 into this first flight configuration. In the flight configuration, the lift coefficient of the wing tip device 7 is less than that required during take-off, but the drag penalty is reduced. Accordingly, the wing tip device in this configuration is well-suited to the climb phase of flight.

In principle, embodiments of the invention may have a wing tip device that is only moveable between these three configurations. However, the wing tip device 7 on the aircraft 1 of the first embodiment is further moveable to a second flight configuration in which the wing tip device 7 is suitable for high-speed cruise. This configuration is shown in FIGS. 6a and 6b. The wing tip device 7 is rotated toward the ground configuration such that it sweeps back beyond the first flight (climb) configuration. The lift-coefficient in this orientation is reduced further, but such an arrangement exhibits improved drag performance, and it is therefore well-suited to cruise flight.

In essence, the first embodiment of the invention recognises that once an aircraft has a moveable wing tip device that is configurable between a ground and flight configuration, it is also beneficial to make use of this moveable wing tip device by enabling the wing tip device to adopt configurations that optimise, or otherwise improve, the performance of the aircraft in particular phases of the flight regime. The invention is especially beneficial for take-off of the aircraft.

Figure 7:
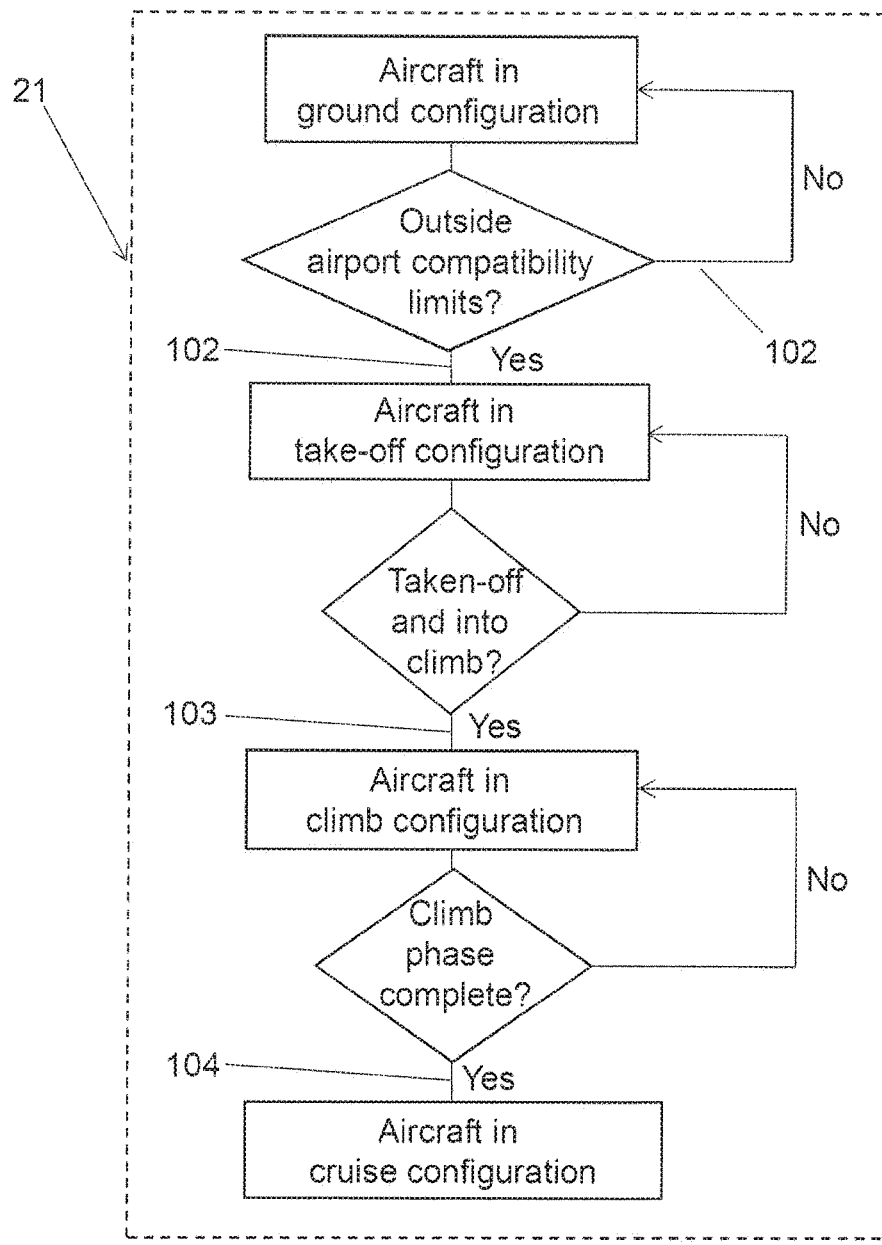
FIG. 7 shows a series of control steps for configuring the wing tip device on the aircraft of the first embodiment.

The aircraft 1 of the first embodiment of the invention comprises a control system 21 for controlling movement of the wing tip device 7 between the different configurations. A flowchart, schematically showing the steps of how the wing tip device is configured by the control system 21, is shown in FIG. 7.

The aircraft 1 is initially within a region of the airport in which the compatibility gate limits need to be applied and the wing tip device 7 therefore adopts the ground configuration. The control system 21 periodically checks this is still the case. Unless or until the aircraft 1 moves beyond this region, the control system indicates that the wing tip should remain in the ground configuration (step 101).

Once the aircraft 1 is beyond the boundary 17, the control system 21 indicates to the pilot that the wing tip device should be moved to the take-off configuration. The pilot acts on this indication and commands and commands actuation of the wing tip device 7 into the take-off configuration (step 102).

The aircraft takes-off, and once the aircraft enters the climb phase of flight the control system 21 indicates to the pilot that the wing tip device should be moved to the climb configuration. The pilot acts on this indication and commands and actuation of the wing tip device 7 into the climb configuration (step 103).

Once the aircraft enters the cruise phase of flight the control system 21 indicates to the pilot that the wing tip device should be moved to the cruise configuration. The pilot acts on this indication and commands and actuation of the wing tip device 7 into the cruise configuration (step 104).

In some embodiments (not shown), it will be appreciated that the control system may automatically take the steps requiring pilot input in the above procedure.

The above-mentioned features have been described with reference to the take-off of the aircraft. Similar methods of configuring the aircraft can be applied to the landing procedure. In the first embodiment of the invention, the aircraft adopts the wing tip device in the take-off configuration for landing. In this sense, the take-off configuration and landing configuration may be used interchangeably. In the first embodiment of the invention, the aircraft maintains the cruise configuration during decent, but switches to the landing configuration as the aircraft approaches the runway. In other embodiments (not shown) the wing tip device may adopt a descent configuration for descending, and then switch to the landing configuration. It will be appreciated that in both cases, the wing tip device has a higher lift coefficient in its landing configuration than in its configuration in the preceding phase of flight. Once the aircraft has landed, the wing tip device is then moved into the ground configuration before the aircraft passes the boundary beyond which the gate limits need to be applied.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of configuring a wing tip device on an aircraft, the aircraft comprising a wing having a fixed wing with the wing tip device moveably mounted at an outer end of the fixed wing, wherein the method comprises the steps of: (i) undertaking ground-based operations at an airport with the wing tip device in a ground configuration, in which ground configuration a span of the aircraft is within an airport compatibility limit: (ii) moving the wing tip device to a take-off configuration in which the wing tip device is moved away from the ground configuration such that the span of the aircraft is increased beyond the airport compatibility limit, and such that the wing tip device has a first lift coefficient; (iii) taking-off with the wing tip device in the take-off configuration; and (iv) moving the wing tip device from the take-off configuration to a flight configuration, in which flight configuration the wing tip device is moved away from the take-off configuration such that the wing tip device has a second lift coefficient, the second lift coefficient is lower than the first lift coefficient, wherein the wing tip device is moveable between the ground and take-off configurations by rotation about an axis oriented perpendicular to an oblique cut plane separating the wing tip device and the fixed wing, and wherein the wing tip device, at a junction with the fixed wing, overcuts or undercuts the fixed wing due to the oblique cut plane.

2. The method of configuring a wing tip device on an aircraft according to claim 1, wherein in the take-off configuration the wing tip device is swept at a first sweep angle, and in the flight configuration the wing tip device is moved such that the wing tip device is swept back to a second sweep angle, the second sweep angle is greater than the first sweep angle.

3. The method of configuring a wing tip device on an aircraft according to claim 2, wherein in the take-off configuration the first sweep angle is less than the sweep of the outer end of the fixed wing such that the wing tip device is swept forward relative to the fixed wing.

4. The method of configuring a wing tip device on an aircraft according to claim 1, wherein in the flight configuration the span of the aircraft is also beyond the airport compatibility gate limit.

5. The method of configuring a wing tip device on an aircraft according to claim 1, wherein the flight configuration is a first flight configuration for the climb phase of flight, and the method comprises the step of: (v) moving the wing tip device from the first flight configuration, to a second flight configuration, the second flight configuration is for cruise flight.

6. The method according to claim 5, wherein in the second flight configuration the wing tip device has a third lift coefficient, the third lift coefficient is less than the second lift coefficient.

7. The method of configuring a wing tip device on an aircraft according to claim 5, wherein in the take-off configuration the wing tip device is swept at a first sweep angle, and in the flight configuration the wing tip device is moved such that the wing tip device is swept back to a second sweep angle, the second sweep angle is greater than the first sweep angle, and wherein in the second flight configuration, the wing tip device is swept back to a third sweep angle, the third sweep angle is greater than the second sweep angle.

8. A method of configuring a wing tip device on an aircraft, the aircraft comprising a wing having a fixed wing with the wing tip device moveably mounted at an outer end of the fixed wing, wherein the method comprises the steps of: (i) flying the aircraft with the wing tip device in a flight configuration, in which flight configuration the wing tip device has a second lift coefficient, (ii) moving the wing tip device to a landing configuration in which the wing tip device is moved away from the flight configuration such that the wing tip device has a first lift coefficient, the first lift coefficient is greater than the second lift coefficient; (iii) landing the aircraft at an airport with the wing tip device in the landing configuration: (iv) moving the wing tip device to a ground configuration, in which ground configuration a span of the aircraft is reduced to within the airport compatibility limit, and undertaking ground-based operations at the airport with the wing tip device in the ground configuration wherein the wing tip device is moveable between the flight and the landing configurations by rotation about an axis oriented perpendicular to an oblique cut plane separating the wing tip device and the fixed wing, and wherein the wing tip device, at a junction with the fixed wing, overcuts or undercuts the fixed wing due to the oblique cut plane.

9. An aircraft comprising:
a wing having a fixed wing and a wing tip device moveably mounted to an outer end of the fixed wing, the wing tip device is configurable between:
(i) a ground configuration for use in ground-based operations, in which ground configuration a span of the aircraft is within an airport compatibility limit;
(ii) a take-off configuration in which the wing tip device is moved away from the ground configuration such that the span of the aircraft is increased beyond the airport compatibility limit, and such that the wing tip device has a first lift coefficient; and
(iii) a flight configuration, in which flight configuration the wing tip device is moved away from the take-off configuration such that the wing tip device has a second lift coefficient, the second lift coefficient is lower than the first lift coefficient,
wherein the wing tip device is moveable between the configurations by rotation about an axis which is oriented perpendicular to an oblique cut plane separating the wing tip device and the fixed wing, and
wherein, due to the oblique cut plane, the wing tip device at a junction with the fixed wing overcuts or undercuts the fixed wing.

10. The aircraft according to claim 9, further comprising a control system for controlling movement of the wing tip device between the configurations; wherein the control system is arranged to: receive an input to indicate that the airport gate compatibility limit is allowed to be exceeded; in response to said input, control movement of the wing tip device from the ground configuration to the take-off configuration as part of a take-off procedure; receive an input to indicate that a take-off phase has been completed, and, in response to said input, control movement from the take-off configuration to the flight configuration.

11. An aircraft comprising a wing having a fixed wing with the wing tip device moveably mounted at the outer end of the fixed wing, the wing tip device is configurable between:
(i) a flight configuration, in which flight configuration the wing tip device has a second lift coefficient
(ii) a landing configuration, in which the wing tip device is moved away from the flight configuration such that the wing tip device has a first lift coefficient, the first lift coefficient is greater than the second lift coefficient; and
(iii) a ground configuration, in which the wing tip device is moved away from the landing configuration to a ground configuration in which a span of the aircraft is reduced to within the airport compatibility limit
wherein the wing tip device is moveable between the configurations by rotation about an axis which is oriented perpendicular to an oblique cut plane separating the wing tip device and the fixed wing, and
wherein the wing tip device, at a junction with the fixed wing, overcuts or undercuts the fixed wing due to the oblique cut plane.

12. The aircraft according to claim 11, further comprising a control system for controlling movement of the wing tip device between the configurations; wherein the control system is arranged to: receive an input to indicate that a landing phase has been started, in response to said input, control movement of the wing tip device from the flight configuration to the landing configuration as part of a landing procedure; receive an input to indicate that the landing phase has been completed, and, in response to said input, control movement from the landing configuration to the ground configuration.

13. A method of configuring a moveable wing tip device on an aircraft, comprising the steps of:
(i) undertaking ground-based operations at an airport with the wing tip device in a ground configuration, in which ground configuration a span of the aircraft is within an airport compatibility limit;
(ii) rotating the wing tip device about an axis perpendicular to an oblique cut plane separating the wing tip device and the fixed wing, from the ground configuration to a take-off configuration at which the wing tip device is swept forward relative to the wing and the wing tip device has a high lift coefficient,
(iii) taking-off with the wing tip device in the take-off configuration;
(iv) rotating the wing tip device about the axis perpendicular to an oblique cut plane from the take-off configuration to a flight configuration, in which flight configuration the wing tip device is rotated back from the take-off configuration and the wing tip device has a lower lift coefficient than while in the take-off configuration,
wherein the wing tip device, at a junction with the fixed wing, overcuts or undercuts the fixed wing due to the oblique cut plane.

14. An aircraft comprising:
a wing including a fixed wing and a wing tip device attached to an outer region of the fixed wing, wherein a span of the wing is a distance from an inner region of the wing an outermost edge of the wing tip device, and the wing tip device is configured to move between:
a ground configuration at which the span is a first distance, and the aircraft is configured to have the wing tip device in the ground configuring during ground operations;
a take-off configuration at which the span is a second distance greater than the first distance and the wing has a first-lift coefficient, and the aircraft is configured to take-off while the wing tip device is in the take-off configuration; and
a flight configuration at which the wing has a second-lift coefficient different from the first-lift coefficient,
wherein the wing tip device is moveable between the configurations by rotation about an axis which is oriented perpendicular to an oblique cut plane separating the wing tip device and the fixed wing, and
wherein the wing tip device at a junction with the fixed wing overcuts or undercuts the fixed wing due to the oblique cut plane.

15. The aircraft of claim 14 further comprising a locking assembly configured to selectively lock the wing tip device in each of the ground configuration, the take-off configuration and the flight configuration.

* * * * *